United States Patent [19]
Lupo et al.

[11] Patent Number: 5,948,827
[45] Date of Patent: Sep. 7, 1999

[54] RUBBER COMPOSITION OBTAINED BY RECYCLING SCRAP MATERIAL

[76] Inventors: Joaquin Lupo; Luis Jacinto Tre, both of Ave. Libertador 5023, Loma Hermosa, Buenos Aires, Argentina

[21] Appl. No.: 08/782,451

[22] Filed: Jan. 13, 1997

[30] Foreign Application Priority Data

Jan. 18, 1996 [AR] Argentina ................................. 335114

[51] Int. Cl.$^6$ ...................................................... C08J 11/00
[52] U.S. Cl. ........................... 521/40; 428/903.3; 524/59; 524/68; 524/69; 524/70; 524/71
[58] Field of Search ........................... 521/40; 428/903.3; 524/59, 68, 69, 70, 71

[56] References Cited

U.S. PATENT DOCUMENTS 5,506,283   4/1996   McInnis et al. ...................... 525/333.1

FOREIGN PATENT DOCUMENTS

WO92001760   2/1992   WIPO .

OTHER PUBLICATIONS

Perry's Chemical Engineers' Handbook, Sixth Edition.

*Primary Examiner*—James J. Seidleck
*Assistant Examiner*—Olga Asinovsky
*Attorney, Agent, or Firm*—Steinberg & Raskin, P.C.

[57] ABSTRACT

A rubber composition obtained by recycling scrap material and adapted for use as raw material for manufacturing products for building, automobile accessory, and footwear industries possibly as a replacement for wood, zinc sheet, fiber cement, plastic and any other rigid or semirigid material. The composition includes from about 66% to about 77% of particles of ground tires having a size between about 18 and about 30 microns, from about 15% to about 22% of particles of ground plastic material having a size between about 18 and about 30 microns, and from about 8% to about 12% of a solution of acid with toluene or methyl isobutyl ketone. The acid may be lactic acid, phosphoric acid or formic acid. The percentage of acid in the solution by volume is from about 12% to about 50% and the percentages of toluene or methyl isobutyl ketone in the solution by volume is from about 50% to about 88%.

20 Claims, No Drawings

5,948,827

RUBBER COMPOSITION OBTAINED BY RECYCLING SCRAP MATERIAL

FIELD OF THE INVENTION

The present invention relates to a rubber composition obtained by recycling scrap material such as tires and plastics, and which is usable as raw material for the manufacture of several products used, e.g., in the building, automobile accessory and footwear industries.

BACKGROUND OF THE INVENTION

At the present time, the recycling of discarded tires has constituted a serious problem worldwide, since, in principle, one of the main uses of such tires is to relocate them in the automobile market with the safety problems which that entails.

As noted in an article of the newspaper Ambito Financiero dated Nov. 28, 1995, page 10, columns 4 through 6, " . . . no efficient method to degrade used rubber has been discovered yet. Experiments are being made to use it as fuel for boilers. As an example of the difficulties that the developed countries have as regards the disposal of this kind of waste . . . Some entrepreneurs found the solution and the gold-mine at the same time: the exportation to developing nations of used tires 'In the last few years thousands of containers of scrap goods have come to Argentina: in addition to endangering the life of automobile drivers they constitute a menace to the local industry of tires and to job opportunities' . . . ".

As observed in the first part of this article, no efficient method has been obtained so far for the degradation of rubber. In a similar vein, the same predicament exists with respect to plastic, for which reason an ecologically optimal way is to reuse these materials so that they do not turn into waste. The main goal of this invention refers precisely to the creation of a new raw material with sufficient versatility so as to be base material for several industrial applications.

There exist in the market methods of reusing tires, which employ at most 20% of the used tires, to which virgin rubber is added and the result is a product used for the manufacture of, for example, solid tires for tricycles or bicycles, carpeting for automobiles, etc., with a reduced cost with respect to a product made entirely with virgin rubber. However, it is problematic that these methods, as well as other methods which process recycled tires for use, reject the use of fabric and/or metal residues (existing in tires) which are burnt or thrown away.

In order to expand on even more the description of the field of application of used tires, reference is made to the book Gestion Integral de Residuos Solidos (integral treatment of solid residues) which on pages 856 through 859, paragraph 15.13, makes direct reference to the handling of used tires in the United States. This book mentions that " . . . Every year in the United States approximately 281 million tires are replaced. It is estimated that 237 million are discarded. Ten million are reused and 33 million are recapped or retreaded. ]From 2 to 3 billion tires have remained stored in piles, and some millions more have been dumped illegally. Approximately 14 percent of the discarded tires are used for fuel; it is estimated that 5 percent is used for chipboard, rubber powder and miscellaneous uses and 4 percent is exported . . . ".

The foregoing information, and the specific numerical examples above being taken into account, the large quantity of existing base material is clearly appreciated, and furthermore, as observed in the same book " . . . Generally, there are no specifications for the recycling of used tires because many of the applications are new and are not developed completely. The specifications for reusable tires vary according to the recappers, retreaders and remanufacturers of tires."

OBJECTS OF THE INVENTION

Accordingly, it is an object of the present invention to provide a new use for scrap materials particularly used vehicular tires but also plastic material.

It is another object of the present invention to provide a new material which is easily and readily manufactured and can be used to replace other materials in manufacturing processes in certain industries. In this regard, the invention is preferably used in connection with the recycling of used tires and it produces a new raw material capable of replacing with complete success in the manufacture of numerous items, wood, sheet zinc, fiber cement, plastic and any other rigid or semirigid material, owing the use of 100 per cent of the material that comes from the used tire (rubber, fabric, etc.). The manufacturing cost of the raw material is equivalent to approximately 50% in contrast to the cost of such substitutes which may be used in the manufacture of similar products (polyethylene, rubber, PVC, etc.).

DESCRIPTION OF THE PREFERRED EMBODIMENTS

In order to achieve these objects and others, the rubber composition, also referred to as humidified rubber powder, obtained by recycling scrap material is produced through several different stages of the process of manufacture of the powder. The stages include:

a) washing the tires and then drying the tires, e.g., by forced hot air or by normal ventilation;

b) cutting the tires into small pieces, e.g., by means of a special mill;

c) grinding the small pieces of tires in special mills until tire particles having a size preferably from about 18 microns to about 30 microns are obtained and for this purpose, the mills include an appropriate selection of sieves in order to obtain particles of this size, the small pieces and the remaining particles of tires not passing through the sieves being ground again until obtaining a size within the range (It should be mentioned that in this process 100% of the scrap tires (rubber and fabric) is used. However, if tires with steel meshes are used, e.g., steel belted radials, and if the disposal of the metal residues thereof is desired, the ground rubber undergoes a cleaning process through electromagnets which will remove large steel residues from the ground matter, i.e., the tire particles are passed by an electromagnet which attracts the steel matter.);

d) after the grinding process, recovered or recycled plastics are added to the tire particles, the plastic being first washed and ground with adequate mills and sifted until plastic particles are obtained having a size substantially equivalent to the particle size of the tire particles, e.g., a size from about 18 microns to about 30 microns, possibly by passing the ground plastic through meshes similar to those operating on the tire component; and e) the tire particles, or rubber particles if the tires included steel matter which was removed by electromagnets, is put into conventional mixers which may be of the following type: paddle, disk (dispersing), drum, or others, then the plastic, and a solution composed of an acid (e.g., lactic acid, phosphoric acid or formic acid) and toluene or M.I.K.

(methyl isobutyl ketone) are added in appropriate proportions until achieving a final homogeneous rubber composition, i.e., a product which has an appearance of humidified powder, which is then ready for its use or packaging in containers suitable for that purpose.

It is pointed out that in accordance with environmental conditions both with respect to humidity and temperature, and in order to maintain an obtained product with the desired characteristics, the acid—toluene or MIK solution is to be regulated within a range of acid variation between about 12% and about 50%.

For the purpose of specifying even more the quantitative structure of the raw material for producing the rubber composition or humidified rubber powder in accordance with the invention, the following examples are provided.

| Material | Percentage by volume |
| --- | --- |
| Discarded tires | 66%–77% |
| Recovered and ground plastics | 15%–22% |
| Acid with Toluene or MIK solution (composed according to the following percentages: Acid 12%–50%; Toluene or MIK 50%–88% | 8%–12% |

Once the raw material is obtained, several products may be manufactured, according to two of the main varieties which may be obtained (rigid or semi-rigid), for example as set forth in the table below.

| Rigid solid | Building (bricks, tiles etc.) |
| --- | --- |
| | Pallets |
| | Telephone poles or electricity pylons |
| | Boxes (cases) for accumulators (storage batteries) for automobiles |
| By extrusion | Pipes for sewers |
| | Downspouts |
| By injection | Soles for shoes |
| | Gutters |
| | Sheets |
| | (it replaces pressboard, zinc, fiber cement) |
| | Roof tiles |
| By pressing | Floor tiles |

Moreover, the product obtained may be stuck with generic vinyl or synthetic glues, neoprene, cyanoacrylates or contact cement. It may also be painted for appropriate finishing.

As supplemental information, it is pointed out that in certain applications it is likely that the metal of the discarded tires should be removed (if they are tires with steel metal), since if the product to be obtained is of semirigid nature, if bending occurs, there exists the possibility of a tear on the wall, furthermore, if it is oxidized it may come off and this may result in an area of less resistance on the wall of the product.

In sum, one preferred implementation of the humidified composition obtained by recycling scrap material, and adapted for use as raw material for manufacturing products for building, automobile accessory, and footwear industries, in accordance with the invention comprises from about 66% to about 77% of particles of ground tires having a size between about 18 and about 30 microns, from about 15% to about 22% of particles of ground plastic material having a size between about 18 and about 30 microns, and from about 8% to about 12% of a solution of acid with toluene or methyl isobutyl ketone. The acid is selected from the group consisting of lactic acid, phosphoric acid and formic acid. The percentage of acid in the solution by weight is from about 12% to about 50% and the percentages of toluene or methyl isobutyl ketone in the solution by weight is from about 50% to about 88%.

One basic embodiment of the method for producing the rubber composition obtained by recycling scrap tires and plastic material comprises the steps of washing and drying the tires, cutting the tires into small pieces, grinding the small pieces of tires, e.g., in a mill, until particles having a size of from about 18 microns to about 30 microns are obtained, washing and grinding the plastic material until particles having a size from about 18 microns to about 30 microns are obtained, and mixing the tire particles, the plastic particles and a solution composed of acid and one of toluene and methyl isobutyl ketone until a homogeneous product with an appearance of humidified powder is obtained. If the tires include steel mesh, the steel mesh can be removed from the ground tire particles by passing electromagnets over the tire particles.

To grind the small pieces of tires until particles having a size of from about 18 microns to about 30 microns are obtained, the tire particles are ground and then passed over sieves having an appropriate mesh size such that tire particles having a size of from about 18 microns to about 30 microns pass through the sieves, and the portion of the ground tire particles not having a size from about 18 microns to about 30 microns is passed to be ground again. Similarly, to grind the plastic material until particles having a size of from about 18 microns to about 30 microns are obtained, the plastic particles are ground and passed over sieves having an appropriate mesh size such that tire particles having a size of from about 18 microns to about 30 microns pass through said sieves, and the portion of the ground plastic particles not having a size from about 18 microns to about 30 microns are passed to be ground again.

With respect to the mixing of the powder, the tire particles can be placed first in a mixer, the plastic particles then added thereto and then the solution composed of acid and one of toluene and methyl isobutyl ketone added. This order is not critical to the invention. The mixer may be a paddle mixer, a disk dispersion mixer or a drum mixer. The tire particles, the plastic particles and the solution composed of acid and one of toluene and methyl isobutyl ketone may be mixed in proportions such that the resultant humidified powder contains from about 66% to about 77% of tire particles by weight, from about 15% to about 22% of plastic particles, and from about 8% to about 12% of the solution of acid and one of toluene and methyl isobutyl ketone.

The examples provided above are not meant to be exclusive. Many other variations of the present invention would be obvious to those skilled in the art, and are contemplated to be within the scope of the appended claims. For example, although it is ideal to use recycled materials such as used tires and recycled plastics, it may also be possible to use virgin tires and plastic.

We claim:

1. A method for producing a rubber composition by recycling scrap tires and plastic material, comprising the steps of:

washing and drying the tires, cutting the tires into small pieces, grinding the small pieces of tires to obtain tire particles, washing and grinding the plastic material to obtain plastic particles, and mixing the tire particles, the plastic particles and a solution composed of an acid selected from a group consisting of lactic acid, phosphoric acid and formic acid, and one of toluene and methyl isobutyl ketone until a homogeneous composition is obtained.

2. The method of claim 1, wherein the tires included steel mesh, further comprising the step of:

removing the steel mesh from the ground tire particles by passing electromagnets over the tire particles.

3. The method of claim 1, wherein the tires are ground into the small pieces in a mill.

4. The method of claim 1, wherein the step of grinding the small pieces of tires comprises the steps of:

passing ground tire particles over sieves constructed such that tire particles having a size of from about 18 microns to about 30 microns pass through said sieves, and passing a portion of the ground tire particles not having a size from about 18 microns to about 30 microns to be ground again.

5. The method of claim 1, wherein the step of grinding the plastic material comprises the steps of:

passing the ground plastic particles over sieves constructed such that tire particles having a size of from about 18 microns to about 30 microns pass through said sieves, and passing a portion of the ground plastic particles not having a size from about 18 microns to about 30 microns to be ground again.

6. The method of claim 1, wherein the step of mixing the tire particles, the plastic particles and the solution composed of the acid and one of toluene and methyl isobutyl ketone comprises the steps of:

placing the tire particles in a mixer, then adding the plastic particles to the mixer, and thereafter adding the solution composed of the acid and one of toluene and methyl isobutyl ketone to the mixer.

7. The method of claim 1, wherein the step of mixing the tire particles, the plastic particles and the solution composed of the acid and one of toluene and methyl isobutyl ketone comprises the steps of:

placing the tire particles in a paddle mixer, adding the plastic particles to the paddle mixer, and adding the solution composed of the acid and one of toluene and methyl isobutyl ketone to the paddle mixer.

8. The method of claim 1, wherein the step of mixing the tire particles, the plastic particles and the solution composed of the acid and one of toluene and methyl isobutyl ketone comprises the steps of:

placing the tire particles in a disk dispersion mixer, adding the plastic particles to the disk dispersion mixer, and adding the solution composed of the acid and one of toluene and methyl isobutyl ketone to the disk dispersion mixer.

9. The method of claim 1, wherein the step of mixing the tire particles, the plastic particles and the solution composed of the acid and one of toluene and methyl isobutyl ketone comprises the steps of:

placing the tire particles in a drum mixer, adding the plastic particles to the drum mixer, and adding the solution composed of the acid and one of toluene and methyl isobutyl ketone to the drum mixer.

10. The method of claim 1, wherein the step of mixing the tire particles, the plastic particles and the solution composed of the acid and one of toluene and methyl isobutyl ketone comprises the step of:

adding the tire particles, the plastic particles and the solution composed of the acid and one of toluene and methyl isobutyl ketone in proportions such that the resultant humidified powder contains from about 66% to about 77% of tire particles by volume, from about 15% to about 22% of plastic particles, and from about 8% to about 12% of the solution of acid and one of toluene and methyl isobutyl ketone.

11. The method of claim 10, wherein the percentage of the acid in the solution by volume is from about 12% to about 50% and the percentages of one of toluene and methyl isobutyl ketone in the solution by volume is from about 50% to about 88%.

12. The method of claim 1, wherein the acid is lactic acid.

13. The method of claim 12, wherein the solution is composed of toluene and lactic acid.

14. The method of claim 12, wherein the solution is composed of methyl isobutyl ketone and lactic acid.

15. The method of claim 11, wherein the acid is phosphoric acid.

16. The method of claim 15, wherein the solution is composed of toluene and phosphoric acid.

17. The method of claim 15, wherein the solution is composed of methyl isobutyl ketone and phosphoric acid.

18. The method of claim 1, wherein the acid is formic acid.

19. The method of claim 18, wherein the solution is composed of toluene and formic acid.

20. The method of claim 18, wherein the solution is composed of methyl isobutyl ketone and formic acid.

* * * * *